Dec. 23, 1969     W. K. COLLINS     3,485,024
FRUIT HARVESTER
Filed Sept. 9, 1966     4 Sheets-Sheet 1
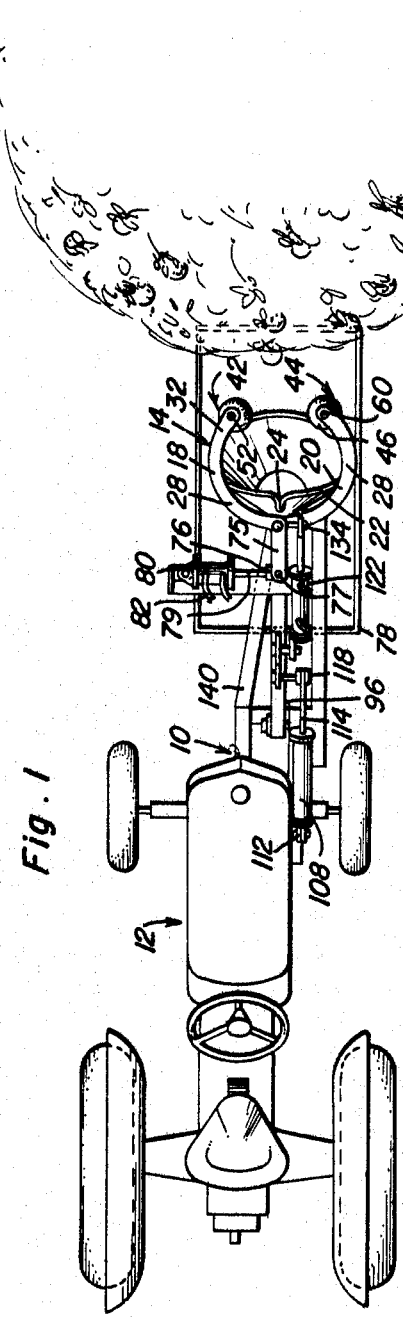
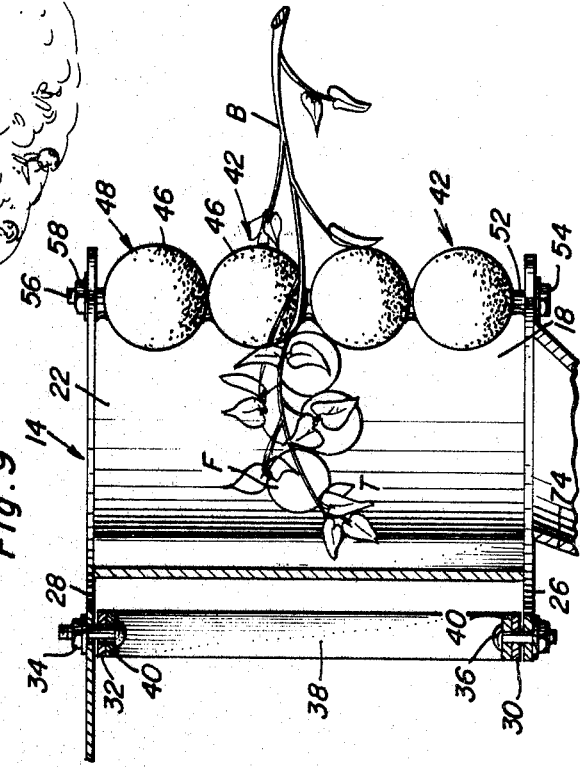
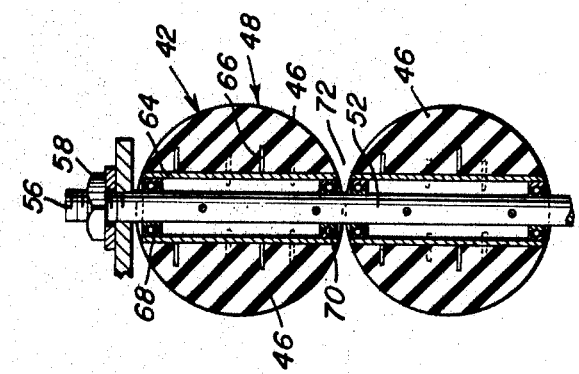
Wilbur K. Collins
INVENTOR.

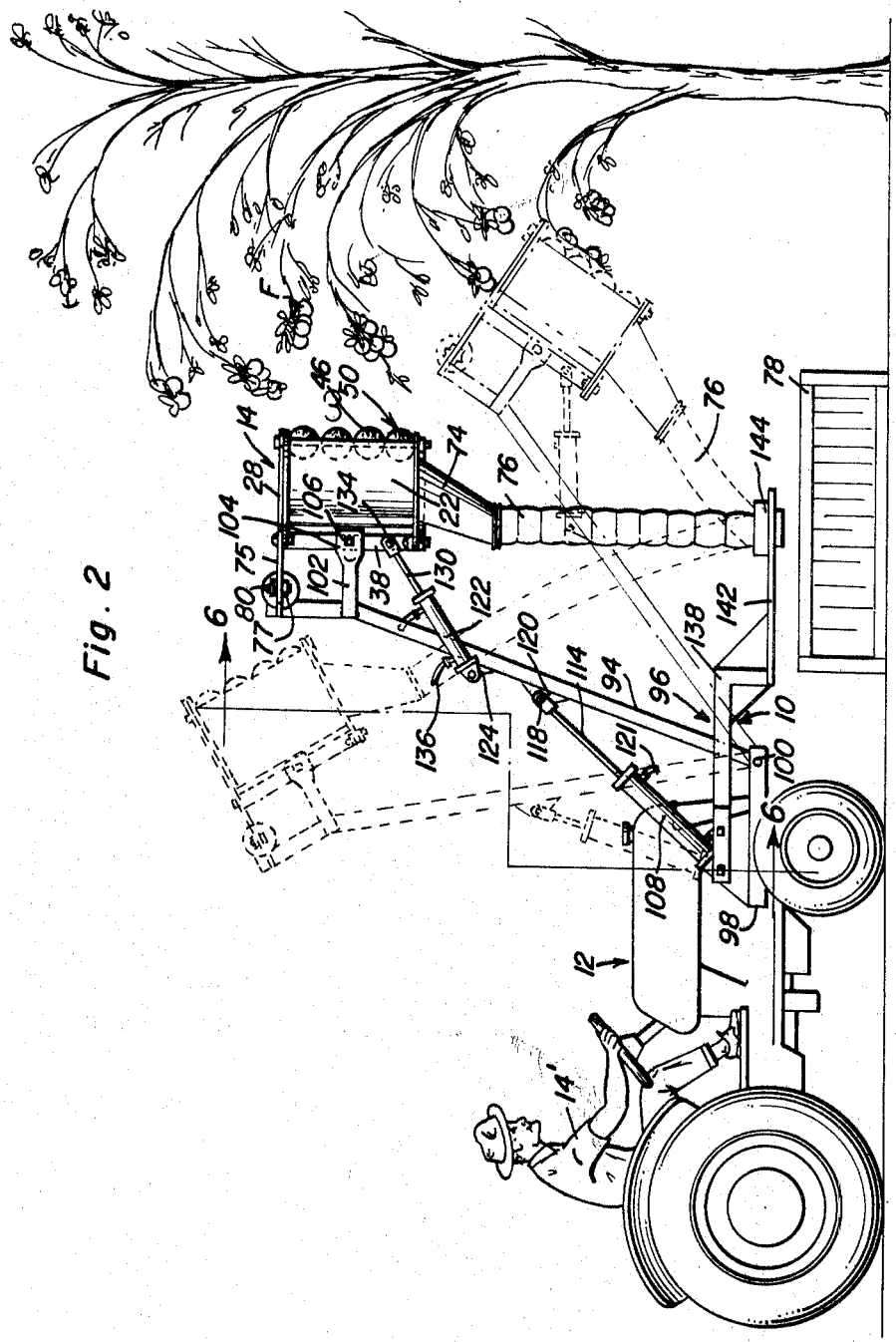

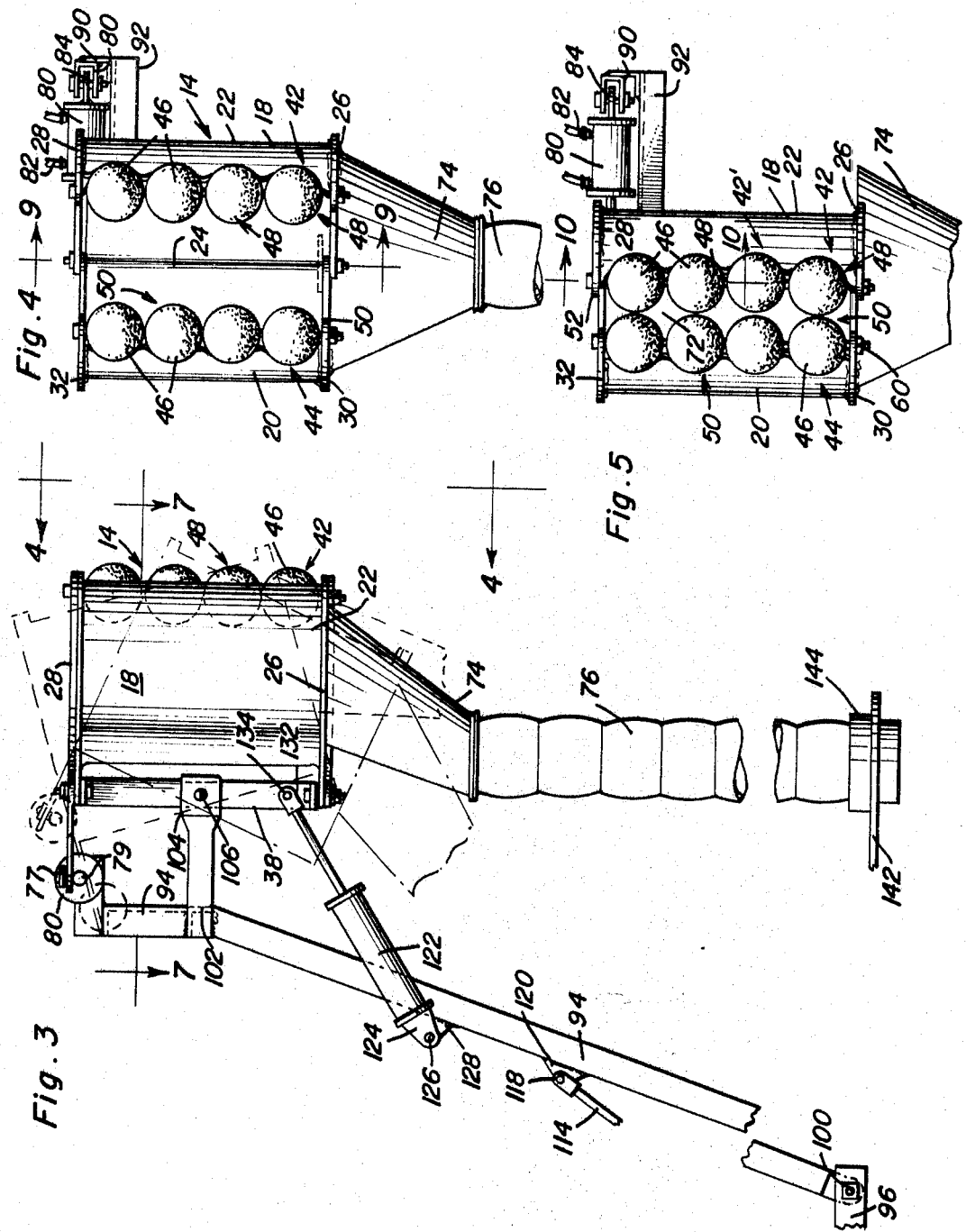

Dec. 23, 1969 W. K. COLLINS 3,485,024
FRUIT HARVESTER
Filed Sept. 9, 1966 4 Sheets-Sheet 4
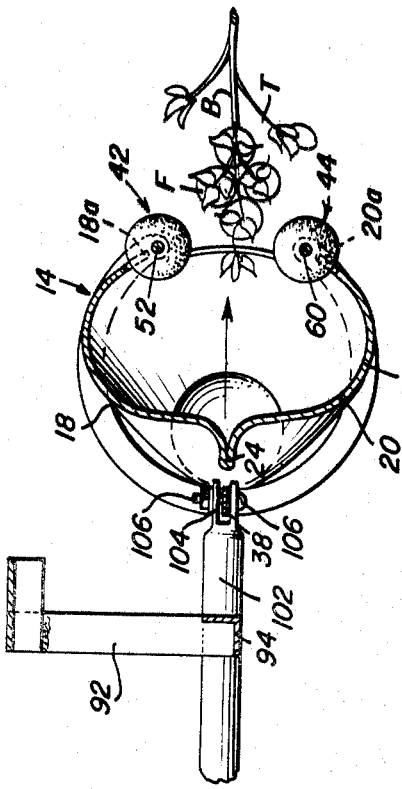
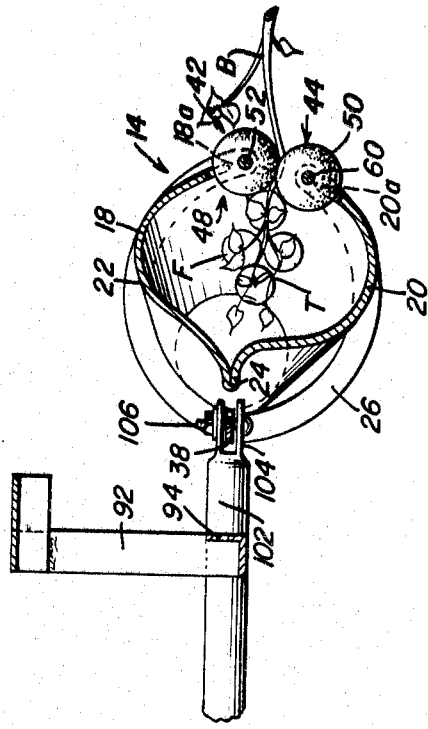
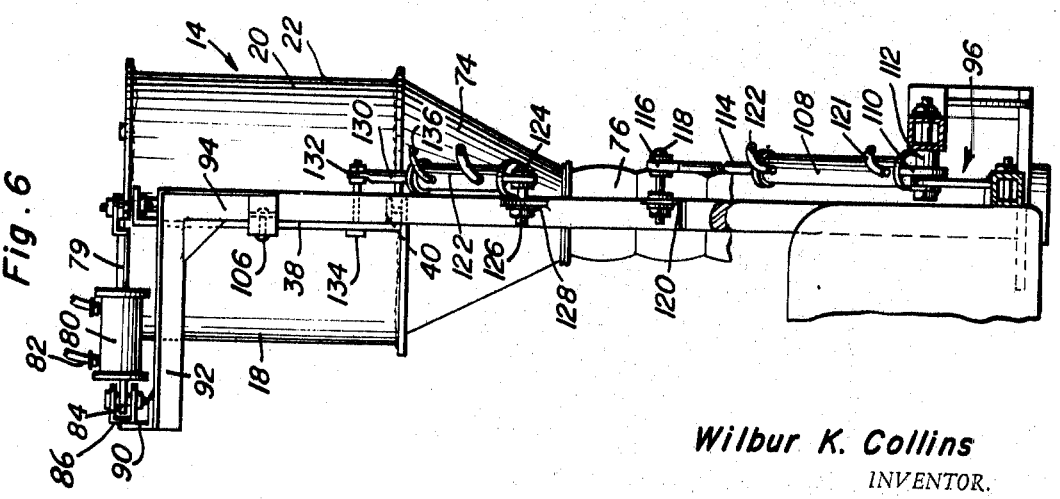
Wilbur K. Collins
INVENTOR.

United States Patent Office 3,485,024
Patented Dec. 23, 1969

3,485,024
FRUIT HARVESTER
Wilbur K. Collins, 215 E. Orange,
Wauchula, Fla. 33873
Filed Sept. 9, 1966, Ser. No. 578,311
Int. Cl. A01g 19/00
U.S. Cl. 56—328                6 Claims

ABSTRACT OF THE DISCLOSURE

A fruit harvesting device which is mobile and includes pivoted jaw members having coacting free edges with freely rotatable elements adjacent thereto. The jaw members and elements are adapted to be positioned around a limb and moved relative thereto so as to strip fruit therefrom and convey it to a receptacle.

---

This invention generally appertains to improvements in harvesters and the like agricultural implement and more particularly relates to a novel fruit harvester for mechanically removing growing fruit from fruit trees in a manner most remarkably simulative of conventional hand picking or plucking of individual pieces of fruit from a tree.

An important object of the present invention is to provide a novel fruit harvester which possesses extreme versatility in that it is adjustable for usage in connection with the harvesting of any type of fruit and the like from trees; is adaptable for mounting on a mobile carrier and for control from a ground level and also for manual portability in the nature of a compact, simple unit; and is adaptable to efficiently and effectively operate in any type of fruit grove, irrespective of the ground contour, climatic conditions and any other factors.

Another important object of the present invention is to provide a novel fruit harvester which is easily and conveniently adjustable so as to harvest only one size of fruit on any given fruit tree which bears fruit of different sizes that ripen at different periods of time.

A further important object of the present invention is to provide a novel fruit harvester which possesses, in any state of adjustment, a most efficient and unerringly effective degree of selectivity in the size of fruit that it will pluck or harvest from a tree and which, at the same time, is so constructed that it will not, during its harvesting operation of only one type of crop, injure the fruit of another size crop on the tree and, of course, will not injure, either surface or interior-wise, the harvested or plucked fruit.

Another important object of the present invention is to provide a novel fruit harvester which is so constructed that it can be mechanically actuated in its movements into and from the foilage of a tree and in its plucking or picking of fruit from the tree, so as to harvest the fruit in a manner which is remarkably simulative of the plucking or picking of individual pieces of fruit by hand.

A still further important object of the present invention is to provide a novel fruit harvester which can be operated under any conditions, it being operable even at night without the fruit being visible, and which can operate in any type of fruit grove and in connection with any type of tree or the like for the harvesting, without injury or damage to the tree, its branches and twigs, any type of fruit of the same general size, indicative of the ripened conditions of the fruit, without any damage or injury to the fruit.

Another important object of the present invention is to provide a compact and extremely inexpensive fruit harvester, which can be mounted on any type of tractor or any other mobile vehicle and which can be mechanically operated by the operator of the vehicle, so that only only one person's time need be expended, and which is adaptable for use in harvesting association with any size tree and which has a very minimum need of maintenance and which, due to its simplicity, does not require the services of any operator, other than one skilled to manipulate a mobile vehicle.

A still further important object of the present invention is to provide a fruit harvester which can be of the manually transportable type and which can be controlled by physical forces under the operation of the operator, such mechanical or physical forces being either mechanical connections or hydraulically actuated components.

An important feature of the present invention resides in the provision of a pair of cooperating jaw-like members which are pivotally associated so as to define a hollow casing when in a closed position, such members having cooperating, free jaw-like edges and means disposed at the jaw edges for abutting cooperation, when the jaw-like members are in a closed relationship or position, such means establishing apertures or embrasures, through which branches, twigs and fruit of an undesired small size can pass but through which fruit of the desired size cannot pass, so that the desired size fruit are, in effect, plucked from the stem attaching branches of the tree.

A further meritorious feature of the present invention resides in the construction of such means from a plurality of semi-firm spherical ball members which are freely rotatable and disposed in alignment at the jaw-like edges of each of the jaw-like members, with the apertures being created by the openings established between the ball members when they are in closed, abutting relationship.

A further meritorious feature of the present invention resides in the provision of means for mechanically, more particularly hydraulically, opening and closing the jaw-like members, a boom support for the casing with means being provided for supporting on the upper end of the boom the actuating means for opening and closing the jaw-like members or components of the casing and with means being provided for moving the boom into various angular positions and means being pivotally connected between the boom and the casing for tilting the casing, whereby the casing is pivotable about two normally vertically spaced, horizontal axes, the one being the mounting point of the boom on a support structure, which may be mobile in nature, and the other being the pivotal interconnection between the boom and the casing for the means for tilting the casing, independent of the curvilinear swinging movement of the boom itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a fruit harvester, constructed in accordance with the present invention, and showing the same in operative association with a fruit tree;

FIGURE 2 is a side elevational view of the fruit harvester, illustrating the operation thereof with respect to a fruit burdened tree and a receptacle into which the harvested or plucked fruit is to be deposited, in accordance with the present invention;

FIGURE 3 is a detail side elevational view, on an enlarged scale, of the casing construction, per se, together with the fruit depositing or dumping means which is in structural and functional association therewith;

FIGURE 4 is a front elevational view of the ball members at the jaw-like edges of the pair of cooperating jaw-like members, which make up the casing, and is a view taken on line 4—4 of FIGURE 3 and looking in the direction of the arrows;

FIGURE 5 is an elevational view, similar to FIGURE 4, but showing the jaw-like members of the casing in a closed position with the balls in abutting relationship;

FIGURE 6 is a detailed vertical, cross-sectional view taken substantially on the line 6—6 of FIGURE 2;

FIGURE 7 is a horizontal, cross-sectional view, taken substantially on line 7—7 of FIGURE 3;

FIGURE 8 is a view, similar to FIGURE 7, but showing the jaw-like members in a closed relationship whereby the fruit is enclosed therein and is to be stripped or plucked from the branches;

FIGURE 9 is a detailed, fragmentary, vertical sectional view, taken substantially on line 9—9 of FIGURE 4; and FIGURE 10 is a detailed, vertical sectional view taken substantially on line 10—10 of FIGURE 5 and showing in detail the construction, arrangement and mounting of the ball members which, in effect, constitute the abutting and cooperating free jaw edges of the pair of cooperating jaw-like members which make up the casing.

Referring now more particularly to the accompanying drawings, the fruit harvester, as generally shown in FIGURES 1 and 2, is identified by the reference numeral 10. The harvester 10 is shown, primarily for exemplary purposes, in structural association with a conventional tractor 12, which is equipped with a hydraulic power take-off system and with valve means (not shown) that can be actuated by the operator 14′ of the tractor so as to control the various operations of the fruit harvester 10.

The harvester 10 is primarily composed of a harvesting means 14, which is shown in greater detail in FIGURES 4, 5 and 7 through 10, inclusive. The harvesting means 14 includes a pair of cooperating jaw-like members 18 and 20, which define a hollow, tubular casing 22. As can be appreciated from consideration of FIGURES 7 and 8, the jaw-like members 18 and 20 are formed in integral association, that is, they are formed from one somewhat tubular shaped piece of rigid but flexible and bendable material, such as plastic, aluminum, tin or hard rubber. The jaw-like members 18 and 20 are integrally associated by a fold 24, which, in effect, constitutes a hinge about which the jaw-like members 18 and 20 can swing from an open to a closed position, as shown in FIGURES 7 and 8. The fold or hinge connection 24, while shown in integral association with the jaw-like members 18 and 20 because of the fact that such members, as shown, are formed from a single section of tubular material of any suitable nature, may be a structural pivot or hinge connection, in the event, as contemplated, that the jaw-like members 18 and 20 are formed in two separate and divisible parts.

The arcuate or semi-curved members 18 and 20 are given and retain a pronounced configuration so that when in, either the open position of FIGURE 7 or the closed position of FIGURE 8, the casing 22, which is defined by the members 18 and 20 is somewhat cylindrical in cross-section.

The two semi-curved or arcuate jaw-like members 18 and 20 are provided at their upper and lower free edges with arcuate flanges. In this respect, the casing 22, defined by the members 18 and 20, is open at its top and bottom ends, such being designated because the casing is normally vertically or substantially vertically disposed or orientated, as is clear from FIGURE 2.

Thus, as shown in FIGURES 4 and 5, the jaw-like member 18 is provided on its lower edge with arcuate outstanding flange 26 and is provided at its upper edge with a similar, arcuate, outstanding flange 28. Similarly, an arcuate or semi-circular flange 30 is provided on the lower edge of the member 20 and a similar arcuate flange 32 is provided on the upper edge of the jaw-like member 20. As shown in FIGURES 4, 5 and in particular FIGURE 9, the flanges are arcuate or semi-circular in plan view and extend from the inner joining hinge 24 to the free jaw-like edges 18a and 20a (shown more particularly in FIGURE 7), with the flange 28 having its rear end overlapping the flange 32 and being joined thereto by a pivot assembly 34. The rear end of the flange 26 underlies the rear end of the companion flange 30 and is presently attached thereto by a vertical pivot assembly 36.

As shown more clearly in FIGURE 9, the pivot assemblies, which are constituted by bolt and nut assemblies or may be constituted by any other mechanical equivalent, also function as fastening means for a bar 38, which spans the extent between the pivotally connected rear ends of the upper and lower flanges and which is provided at its lower and upper ends with lateral flanges 40, whereby it is attached to the pivot connection assemblies.

As can be appreciated from a consideration of FIGURES 3 and 9, the pivotally interconnected and overlapping rearward ends of the lower flanges 26 and 30 on the jaw-like members or sections of the casing 22 and the pivotally interconnected rearward ends of the upper flanges 28 and 32 are faced rearwardly from the pivot or hinge connection 24.

The jaw-like members 18 and 20 or sections of the sectional casing 22 terminate at their ends, opposite the point of hinge connection 24 in axial and therefore, substantially vertical free jaw-like edges 18a and 20a. These edges, as shown in FIGURE 7, terminate inwardly of the forward or outer ends of the upper and lower sets of flanges, so that the actual clamping or gripping edges of the jaw-like members 18 and 20 are constituted by coacting and cooperating clamping means 42 and 44, which are carried by the forward or outer end of the upper and lower sets of flanges and which are disposed in advance of the free edges 18a and 20a of the jaw-like members 18 and 20, respectively.

The gripping and clamping means 42 and 44 are identically constructed and, as shown in FIGURES 4 and 5, each includes a plurality of spherical members or balls 46, the balls being formed from semi-firm material, that is, a plastic, rubber or the like which has some degree of flexibility or give but which is over-all rather firm in that it does not possess an extremely yielding quality. The balls 46 are formed in vertical alignment, as indicated by the reference numeral 48, in advance of the free edge 18a and are similarly provided in vertical alignment, as indicated by the reference numeral 50 in advance of the free edge 20a of the jaw-like member 20. In this respect, the semi-hard balls of the group 48 are mounted on a rigid shaft 52, which is formed with a lower head end 54 and which has its shank portion passed through a suitable aperture in the forward or outer end of the lower flange 26 of the jaw-like member 18 and which has its upper threaded end portion 56 passed through a similar aperture in the outer forward end of the flange 28, with the nut 58 being provided thereon so as to lock the balls 46 in vertically aligned relationship so as to define the vertical column 48, which is shown more particularly in FIGURES 4 and 5.

Similarly, the semi-hard balls 46, which make up or compose the vertical column 50 are mounted on a rigid shaft 60, which extends through suitable aligned apertures or openings formed in the outer or forward ends of the flanges 30 and 32 for the jaw-like member 20.

The balls 46 of both of the vertical columns 48 and 50, which constitutes the actual clamping and gripping means 42 and 44, are mounted, as shown more particularly in FIGURE 10. As shown in FIGURE 10, with relation to the mounting of the balls 46 for the vertical column 48 which makes up or constitutes the gripping means 42, each of the balls is formed from a semi-hard material, such as plastic or hard rubber, which has some give but which is not yieldable. The balls 46 are formed with center bores 62 which receive tubular shafts or rigid sleeves 64. The sleeves are formed with outwardly extending projections or pins 66 which are embedded in the balls, so that the balls are in integral association with the sleeve 62. The sleeves are mounted for independent rotation on the shaft 52 (and shaft 60) by upper and lower convention, sweated in ball bearing assemblies 68 and 70. The ball bearing assemblies have their inner races circumposed on the shaft 52 and thus, each of the balls 46 in both the columns 48 and 50 is mounted for free rotation on the rigid attaching rods 52 and 60.

When the jaw-like members 18 and 20 are moved from an open position, as shown in FIGURE 7, to a closed position, as shown in FIGURES 5 and 8, the balls 46 of the columns 48 and 50, which constitute the gripping or clamping edges on the jaw-like members 18 and 20, are in firm abutting relationship and establish therebetween hole means, apertures or, more specifically stated, embrasures 72. Such embrasures 72 constitute the only means for access to the interior of the casing 22, when the jaw-like members 18 and 20 are in their closed condition or relationship, as shown in FIGURES 5 and 8.

Thus, as can be apparent from a consideration of FIGURES 7 and 8, when the jaw-like members 18 and 20 are open, the clamping jaw means 42 and 44 on the outer free end edges thereof are spaced apart to form an entrance which is adapted to receive a branch B, having fruit F growing thereon. As the casing is moved so as to receive therewithin the fruit F, there is no damage to the fruit or to the branches because they only come in contact with the semi-hard balls 46. When the fruit has completely entered the interior of the casing 22, the jaw-like members 18 and 20 are brought together about the hinge 24 by a means to be described and, therefore, the clamping or gripping means 42 and 44 firmly engage the branches B.

When the casing 22 in its closed condition, with the fruit entrapped and held therein, as shown in FIGURE 8, is moved away from the branch B, it can be appreciated that the fruit F cannot pass through the apertures or embrasures 72 because of the size of the fruit so the branch and twigs T can pass through the apertures or embrasures, without any harm or damage being done thereto. Therefore, the fruit is plucked or picked from the branches, in substantially the same manner that it would be done by hand.

As aforestated, the upper and lower ends of the casing 22 are open and the lower open end is in structural communication with a rigid funnel 74, as shown clearly in FIGURES 2, 3 and 6. The funnel is attached at its lower end to a flexible and collapsible conduit 76, which is adapted to overlie a container 78, such as a crate or box so as to fill the same with the plucked fruit, due to the construction of the funnel 74 and the flexible chute or conduit 76 would not be in any way damaged in its gravitational fall from the casing 22.

Of course, the illustration of a conventional crate 78 is merely for exemplary purposes, because, quite obviously, the lower discharge end of the flexible chute or conduit 76 could overlie a mobile transporting carrier or any other structure for the depositing or dumping of the plucked or harvested fruit F.

Means is provided for opening and closing the jaw-like members 18 and 20, and, as shown more particularly in FIGURES 1 and 3, such means includes a rearward extension arm 75 provided on the rearward or inner end of the flange 28 and connected by a pivot joint 77 to the outer end of a piston rod 79. The piston rod 79 is formed with a piston, (not shown) which is workingly disposed in a hydraulic cylinder 80, having dual conduits or lines 82 connected to its side wall, adjacent its opposing ends. The piston rod 79 slidingly and sealingly extends through the forward end of the cylinder, while the rearward end of the cylinder is provided with an apertured ear 84 that is pivotally attached to a fixed clevis 86. The clevis 86 is fixedly secured to an upstanding bracket arm 90, which fixedly upstands from a support bar 92, the latter being normally horizontally disposed and being effectively carried by the upper end portion of a normally vertically positioned or orientated boom 94, as shown in FIGURE 6. The boom 94, in the exemplary embodiment illustrated, is supported pivotally at its lower end portion by a framework structure 96. As shown more in detail in FIGURES 1 and 2, the framework structure 96 is mounted on the front end of the tractor 12 and is disposed substantially horizontally and projects forwardly of the front end of the tractor. The framework supporting structure 96 includes a side bar 98 that is suitably attached to the front side of the tractor and projected therefrom, with the lower end of the boom 94 being pivotally attached by a pivot pin 100 to the forwardly projecting end of the bar 98.

The boom 94 extends upwardly from its lower pivoted end and, as aforestated, carries at its upper offset end portion the horizontal support bar mount for the hydraulic cylinder 80. The boom supports the jaw-like members 18 and 20, irrespective of their open or closed position, and, for this purpose, the bar 38 is utilized. Thus, as shown more particularly in FIGURES 2 and 3, an arm 102 projects rigidly forwardly of the boom 94 adjacent its upper end portion and terminates, as shown in FIGURES 7 and 8, in an outer clevis end 104 which encompasses the vertical bar 38, intermediate the ends of the latter, and is pivoted thereto by a pivot assembly 106, which may be in the nature of a conventional bolt assembly. Consequently, the bar 38 is attached to the upper and lower sets of flanges for the jaw like members 18 and 20, through the bolt assemblies 34 and 36, as shown in detail in FIGURE 9, and is carried in a pivotal fashion by the swinging boom 94.

Means is provided for swinging the boom about the horizontal axis, defined by the pivot pin 100, so as to move the boom and, consequently, the harvesting means 14 inwardly and outwardly relative to the foilage of a tree, as shown clearly in FIGURE 2. Preferably, such means includes a hydraulic cylinder 108, which is provided at its lower closed end with a projecting apertured ear 110 that is fastened by a bolt assembly 112, constituting a pivot attachment, to the frame structure 96, alongside and upwardly from the frame bar 98. A piston rod 114 slidably and sealingly projects from the upper end of the cylinder and terminates in an eye 116, which is attached by a bolt 118 to an apertured bracket 120 on the boom. In this fashion, a pivotal connection is established between the outer end of the piston rod 114 and the boom so that the position of the boom can be controlled by the piston (not shown) workingly housed in the cylinder 108 under the control the hydraulic lines 121, which, in turn, are controlled by valve means (not shown) in an accessible position for operation by the operator 14 of the tractor 12.

In view of the pivotal connection of the arm 102 to the vertical arm 38, it can be appreciated that the casing 22 is not in rigid structural association with the boom 94. The pivotal association of the connecting bar 102 is provided in order that a further adjustment of the casing 22 may be effected, as shown in FIGURES 2 and 3.

In this respect, a double-acting hydraulic cylinder 122 has its lower closed end provided with a projecting apertured ear 124 which is attached by a pivotal bolt assembly 126 to an apertured upstanding ear 128 on the upper face or side of the boom. The pivot connection 126 is above the pivot connection 118 for the boom cylinder 108. A piston rod 130 is slidingly and sealingly extended through the upper end of the pivotally mounted hydraulic cylinder 122 and has its outer eye end 132 connected by a pivot pin 134 to the vertical bar 38 below the pivot point 106. The cylinder 122 is provided with conventional fluid hydraulic lines 136 and the actuation of the piston (not shown) in the cylinder is controlled by the flow of pressure fluid in the line, which is under the operation of the operator 14 through a conventional valve means.

The frame structure 96 also includes the forwardly projecting arms or frame bars 138, to which the piston 108 is pivoted and a companion frame bar 140. The bars 138 and 140 support, at their outer ends, a supporting plate or shelf 142 which, as shown in FIGURES 2 and 3, is formed with a suitable opening to receive a collar 144. The lower end of the flexible and collapsible discharge conduit or chute 76 is fixedly disposed within the collar 144 so that the lower end of the flexible chute or conduit 76 is anchored to the supporting plate which is carried by the frame structure that is removably attached to the forward end of the tractor 12.

The operation of the harvester 10 is extremely simple, as can be appreciated from a general consideration of FIGURE 2 and a more specific consideration of FIGURES 7 and 8.

The boom 94 with its controlling hydraulic cylinder 108 is pivotally mounted on the supporting framework 96. The framework 96 can be easily secured by bolts or other fastening means to the front end of the tractor 12 or any other vehicle and the hydraulic output system of the vehicle can be employed or, in the absence thereof, the operations may be carried out through hydraulic means, which would include a reservoir and a pump powered or driven by a suitable prime mover mounted on the vehicle.

In using the harvester, the operator approaches the foliage of a tree with the boom 94 in such position that the casing 22 is in a perpendicular position, as shown in FIGURE 2. Depending upon the place in the tree that the best harvesting or picking operations are to be carried out, the operator can position the casing, with the jaw-like members 18 and 20 thereof in an open position, at any particular desired angular relationship by the simple expedient of operating the valve means for controlling the hydraulic cylinders 108 and 122. The cylinder 108 will control the angular placement of the boom relative to the vehicle 12 while the cylinder 122 will control the tilting or angular displacement of the casing 22 relative to the boom.

After the casing, with the jaw-like members 18 and 20 in an open position, as shown in FIGURE 7, has been orientated so that the forward movement of the vehicle 12 will cause a bunch or group of the fruit F to enter the throat portion of the casing, that is, the opening defined by the spaced apart clamping and gripping means 42 and 44, the cylinder 80 is activated through suitable valve means controlling the flow of fluid in the lines 82, so as to bring the jaw-like members 18 and 20 together and to bring the clamping or gripping jaw means 42 and 44 into clamped and tightly abutted engagement. The fruit will then be captive in the casing, as shown in FIGURE 8. Rearward movement of the vehicle, as indicated by the arrow in FIGURE 8, will cause the fruit to be plucked or stripped from the branch B, without any injury thereto and in a manner very simulative of hand picking the fruit. The fruit, now freed from the stems attaching it to the branch B will gravitate down through the flexible conduit or discharge chute 76 and fall gently into the crate 78 or any other type of immobile or mobile container or carrier for the harvested or plucked fruit. The twigs and branches will be free, because of their size, to move back through the apertures or embrasures 72 but, as can be readily appreciated from a consideration of FIGURE 9, the fruit will be too large to pass through the apertures and therefore, will be picked or plucked from the branches.

As aforestated, it is a simple matter for the operator 14 from his driver's position where he is in control of the vehicle 12 to operate simple valve means for the hydraulic cylinders 80, 108 and 122. The hydraulic cylinder 80 controls the opening and closing of the jaw-like members 18 and 20 and the engagement and release of the clamping and gripping means 42 and 44 which constitutes the means whereby the fruit is plucked or picked from the branches B, without damage to the fruit or injury to the branches or the stems or leaves thereof. The cylinder 108 controls, along with the cylinder 122, the desired placement of the container 22, with the jaws spread apart or open, as shown in FIGURE 7, so that, as the vehicle is moved, the desired fruit can be entrapped within the confines of the casing 22. Of course, it is contemplated that a mechanical means, in a strict and limited sense can be used instead of the hydraulic cylinders and pistons for controlling the various operations. Furthermore, it is to be recognized that the boom 94 can be held in the hand of an operator who can control from his ground level position the placement of the casing and the opening and closing of the jaw-like members 18 and 20, either by the hydraulic arrangement or by a mechanical linkage or any other suitable mechanical arrangement.

It can be appreciated that the number of balls 46 in each of the columns 48 and 50, which constitute the gripping means 42 and 44 and create the apertures or embrasures 72 can be increased or decreased, as desired. Furthermore, the size of the balls 46 can be increased or decreased, in a very simple manner, so as to consequently increase or decrease the size of the openings or embrasures 72. Thus, the clamping means 42 and 44 is extremely adaptable for handling any size or type of fruit.

What is claimed as new is as follows:

1. A fruit harvesting device comprising a pair of arcuate jaw members which serve to define a substantially tubular casing, said jaw members having free edges and portions opposite said edges which serve to hinge said members together, clamping means on each member adjacent said free edge which consists of a plurality of aligned, freely rotatable elements and means connected to said members and adapted to move them away from each other so as to admit a tree limb within said casing and then to move them toward each other to the point where said elements adjacent each free edge will be substantially in contact and the limb will be disposed within a space between said elements whereby movement of said device relative to said limb will serve to remove all fruit therefrom which is larger than said space.

2. The device of claim 1 wherein said elements are balls.

3. The device of claim 1 wherein said casing is formed of one-piece construction from semi-flexible material.

4. The device of claim 3 wherein said hinge consists of a fold in said flexible material.

5. The device of claim 1 including means connected to said tubular casing for supporting and moving said casing from tree to tree.

6. The device of claim 1 including means connected to said casing to receive the fruit removed from said limb and convey it to a receiving container.

References Cited

UNITED STATES PATENTS

| | | | |
|---|---|---|---|
| 163,003 | 5/1875 | DeLeidi | 56—333 XR |
| 435,206 | 8/1890 | Cain | 56—334 |
| 1,725,382 | 8/1929 | Trufant | 56—330 |
| 3,077,720 | 2/1963 | Grove et al. | 56—328 |
| 338,303 | 3/1886 | Rudd | 56—333 |
| 774,793 | 11/1904 | Sharp | 56—334 |
| 2,616,768 | 11/1952 | Stemm | 56—328 XR |
| 2,796,721 | 6/1957 | Mattei | 56—334 |
| 2,962,855 | 12/1960 | Sartorio | 56—334 |

RUSSELL R. KINSEY, Primary Examiner